Dec. 31, 1957  C. F. YOUNG  2,817,956
SOIL MOISTURE-CONTROLLED IRRIGATION SYSTEM
Filed Aug. 8, 1955

INVENTOR.
C. FREDERICK YOUNG
BY
ATTORNEY.

2,817,956

Patented Dec. 31, 1957

2,817,956

SOIL MOISTURE-CONTROLLED IRRIGATION SYSTEM

C. Frederick Young, Visalia, Calif.

Application August 8, 1955, Serial No. 527,081

1 Claim. (Cl. 61—13)

The present invention relates to means of supplying aqueous liquids such as water, fertilizing solutions, etc. to the root zones of trees in groves or orchards or to other relatively large areas devoted to the commercial cultivation of plant life.

Irrigation has been employed extensively in arid and semi-arid regions for a great many years, such irrigation generally being of a surface or furrow type wherein water is merely run into shallow furrows and permitted to penetrate into the soil. It is not well adapted to either very porous or very impervious soils and is wasteful. During the last decade water tables have been dropping in most sections of the United States and the present system is designed to supply water and aqueous liquids to the root zones of trees and other plants in such manner that flooding, excessive saturation of the soil with water, excessive evaporation of water from the soil and other disadvantages and wasteful procedures employed heretofore are eliminated. The present invention is directed to a system of subsurface water supply wherein the quantity of water absorbed by the soil is controlled by the moisture requirements of the soil. Moreover, puddling or packing of the soil on the surface, baking of surface areas in heavy soil, the necessity of working the top soil in an attempt to prevent excessive surface evaporation and other disadvantageous aspects of existing surface irrigation methods are obviated by the present invention.

Generally stated, the system contemplated hereby includes the provision of a plurality of spaced, elongated, hollow, disseminating containers having water-permeable walls, each provided with a restricted inlet at one end and a restricted outlet adjacent the other end, such containers or elements being disposed in spaced relation below grade, such containers or elements being connected in series by impermeable, preferably flexible, conduit sections. A plurality of branches, each comprising the above described elements, are then connected to a water reservoir positioned above grade, the volumetric capacity of the reservoir exceeding the volumetric capacity of its associated branches. Water (or aqueous solutions containing suitable fertilizing components) is then supplied to each of the water-distributing branches, water being disseminated from each of the hollow, permeable containers into the surrounding soil in accordance with the requirements of the soil. It is to be remembered that each soil has a so-called "wilt point," at which time the moisture content of the soil is below that at which root systems can absorb moisture and food from the soil. As the moisture content of a soil approaches the wilting point, its absorptive capacity increases and by capillary action water is withdrawn from the porous disseminating containers at a greater rate. As the soil approaches saturation, its absorptive capacity and capillary suction effect decreases. As a result, the system of the present invention automatically supplies soil with adequate moisture in accordance with the requirements of the soil, thereby obviating the periodic saturation and dehydration which is normally encountered where furrow or surface irrigation is used.

An object of the present invention, therefore, is to disclose and provide a system of subsurface water supply for orchards and the like.

Another object of the invention is to disclose and provide a system whereby water or aqueous liquids may be supplied to the root zones of trees and the like in an automatic manner and in accordance with the moisture requirements of the soil.

A still further object of the invention is to disclose and provide an arrangement of elements and means whereby groves and the like may be effectively and economically supplied with water without excessive surface evaporation and waste of water and without the necessity of excessive surface tilling of the soil adjacent the trees of the grove.

These and various other objects and advantages of the invention will become apparent to those skilled in the art from the following description of exemplary forms of arrangements whereby the method may be carried out. For purposes of illustrations, reference will be had to the appended drawings, in which.

Figure 1:
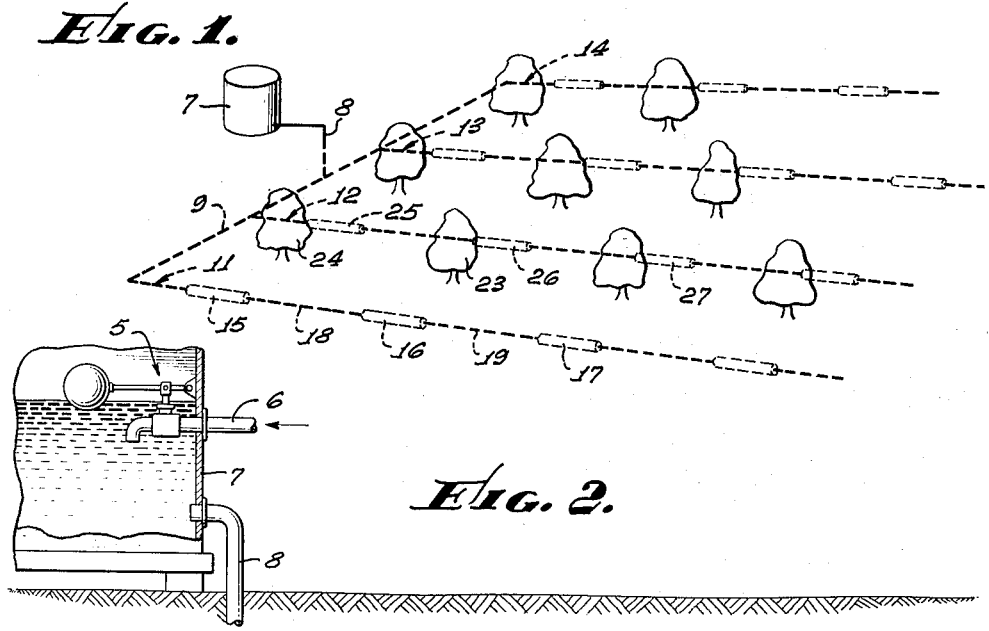
Fig. 1 is a somewhat diagrammatic perspective representation of a portion of a grove equipped with the system.

For purposes of illustration the application of the system to a grove or orchard will be described, it being understood that the system is also applicable to the growing of row crops as well as other products of the soil. The diagrammatic perspective view in Fig. 1 shows four water-distributing branch lines, generally indicated at 11, 12, 13 and 14, extending in parallel and spaced rows. Each of such water-distributing branches, such as for example, the branch 11 comprises a plurality of spaced, hollow, water-permeable, water-disseminating containers or elements such as 15, 16, 17 and the like connected in series by suitable lengths of impermeable conduit, such as the sections 18 and 19. The various water-disseminating, hollow containers are so spaced as to be in proximity to a tree. For example, the hollow containers 15 and 25 of adjacent parallel water-distributing branches indicated in dash lines are positioned to be on opposite sides of a tree 24; the containers 16 and 26 are adjacent to and on opposite sides of the tree 23, etc.

Each of the branch lines 11-14 is buried beneath the surface of the ground a distance of from about twelve inches to thirty inches; the depth may vary in accordance with the root systems of the trees. For example, avocado trees normally have a relatively shallow root system and the various water-disseminating containers can well be buried only twelve inches below the surface of the ground, whereas citrus trees have deeper root systems and in those orchards the water-disseminating containers and branch lines may be buried at a distance of, say, twenty-four inches beneath the surface of the ground. The various branch lines may be connected to a manifold 9 supplied by a riser 8 connected to a reservoir 7 positioned above the ground. Preferably the reservoir 7 has a volumetric capacity equal to or exceeding the volumetric capacity of the various disseminating containers in the branch lines connected to the reservoir. The reservoir 7 may in turn be supplied through a main pipe line 6 leading to a well or other source of water and include a float-controlled inlet valve 5.

Figure 2:
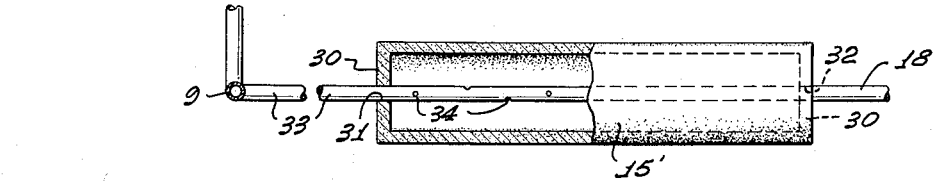
Fig. 2 is an enlarged side elevation, partly in section, of a portion of a subsoil, water-disseminating branch in association with a reservoir.
Figure 4:
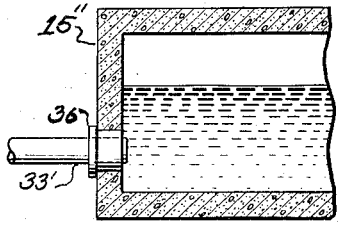
Fig. 4 is an enlarged, partial section of a modified form of connection between a disseminating unit and a supply line.

Each of the water-disseminating elements or containers is preferably made of a porous, water-insoluble material, such as for example, a clay or earthenware composition and, as best shown in Fig. 2, is preferably a spun or jiggered cylindrical object such as 15' having walls of from about one-quarter inch to one-half inch in thickness. The length of each of the units or elements may vary; in actual practive, units of from about one and one-half feet to thirty inches in length have been found most effective. The ends of these cylindrical containers, as indicated at 30, are preferably integral with the side walls and such ends are provided with ports such as 31 and 32. The various sections of interconnecting conduit or tubing may be attached to opposing ports of porous containers in alignment, by the use of any suitable connecting means. One of the simplest methods of installing the water-disseminating, porous containers at desired locations along a branch line is to thread a pipe or tubing 33 made of plastic composition entirely through each of the various units in series, portions of this tubing within a water-disseminating container, such as the container 15' being perforated as indicated at 34. In other words, the entire branch line, including the tubing sections 18 and 19 is an integral line, portions of which are perforated and the perforated portions being enclosed by the water-disseminating units, containers or elements 15, 16, 17 and the like. An additional grommet or a cementing material may be used between the ports 31, 32 and the like and the tubing in order to prevent excessive leakage of water from the disseminating container. The modification, Fig. 4, illustrates a porous water-disseminating unit 15", a grommet 36 seated in an end port, and the end of supply pipe 33' (made of resilient synthetic material) seated by a press fit in the grommet. In actual use each of the disseminating units would be completely filled with water which is slowly supplied to the surrounding earth.

The porosity of each of the containers, such as 15, should be controlled within relatively narrow limits. When earthenware is used, the porosity of each of the units, in terms of ability to absorb water, should be between about 12% and 16% or 18% by weight. Such degree of absorption is indicative of a water-permeable wall capable of permitting the surrounding soil to withdraw water from the disseminating container at a desired rate without saturating the immediately adjacent soil. It has been found, moreover, that the water pressure or head existing within the water-disseminating containers and branch lines should not exceed ten pounds per square inch and preferably be on the order of about five pounds per square inch. The length of the various branches 11, 12, 13, 14, etc. and the grade or slope at which they are laid should take the above factors into consideration. The height of the reservoir 7 should not be excessive and such reservoir may be provided with an overflow to preclude the formation of excessive pressure.

By the use of extruded tubing made from polyethylene, polyvinyl resins, etc. and the use of extruded or jiggered earthenware, water-disseminating containers, a large acreage can be subirrigated at small cost, great savings resulting from such an installation in that the irrigation is accomplished automatically without waste of water and without the necessity of constantly tilling the soil. The space between trees can be covered with a cover crop and mowed, such mowed cover crop acting as an effective mulch to further retard surface evaporation and prevent the formation of a hard, baked, impermeable crust on the surface of the soil.

Figure 3:
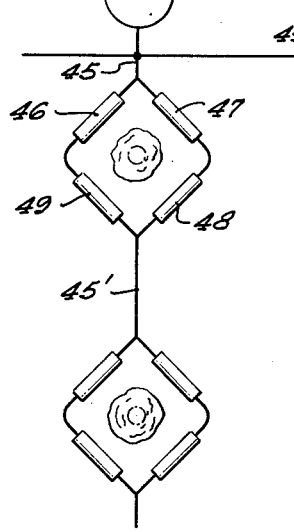
Fig. 3 is a plan view of a modified arrangement which may be employed.

The water-disseminating units may be arranged in various patterns, depending upon the age or size of the trees, their spacing and the like. For example, the various units 15, 16, 17 and the like may be so arranged as to be in the center of each square, the corners of the square being locations of trees. Or, as indicated in Fig. 3, each branch line, such as the branch line 45, may extend down a row of trees, the branch line being periodically furcated so as to include four or more water-disseminating elements 46, 47, 48 and 49, thereby completely encircling the tree at about the region of its drip line. The branch 45 may then continue as by extension 45' to another encircling furcation, etc. Various other arrangements will occur to those skilled in the art.

In all instances, however, provision is made to provide enlarged, permeable, water-disseminating containers, the permeability of the walls of such containers being such that the water is not forced through the walls simply by water pressure or gravity head but is actually drawn from the containers through the permeable walls by the surrounding soil when the latter approaches the wilting point. In the event it is desired to introduce fertilizing materials, solutions or chemicals into the the water, such materials may be readily added to the reservoir 7.

All changes and modifications coming within the scope of the appended claim are embraced thereby.

I claim:

A subsurface system for supplying water and aqueous solutions to orchards and the like, comprising: a plurality of spaced, elongated, hollow, clay composition disseminating elements having porous, water permeable walls, said walls having an absorption of between 12% and 18%, said disseminating elements being horizontally disposed in spaced relation at a depth of about twelve inches to thirty inches beneath the surface of the ground of an orchard or the like; a continuous subsurface plastic composition conduit extending through said spaced elements in succession, the walls of said conduit being water impermeable and provided with spaced ports in communication with each of said elements; and a source of water connected to one end of said conduit, the porosity of said element and the pressure of said water being adapted to permit soil surrounding the elements to withdraw water therefrom when said soil approaches the wilt point without saturating such immediately surrounding soil.

References Cited in the file of this patent

UNITED STATES PATENTS

| | | |
|---|---|---|
| 1,538,669 | Smith | May 19, 1925 |
| 1,604,189 | Nelson | Oct. 26, 1926 |
| 2,653,449 | Stauch | Sept. 29, 1953 |